(12) United States Patent
Ruijter

(10) Patent No.: US 7,889,777 B2
(45) Date of Patent: Feb. 15, 2011

(54) SYSTEM AND METHOD FOR DATA TRANSFER IN FREQUENCY HOPPING WIRELESS NETWORKS

(75) Inventor: Hendricus De Ruijter, Sunnyvale, CA (US)

(73) Assignee: Silicon Laboratories Inc., Austin, TX (US)

( * ) Notice: Subject to any disclaimer, the term of this patent is extended or adjusted under 35 U.S.C. 154(b) by 669 days.

(21) Appl. No.: 11/936,567

(22) Filed: Nov. 7, 2007

(65) Prior Publication Data

US 2008/0107157 A1 May 8, 2008

Related U.S. Application Data

(60) Provisional application No. 60/857,740, filed on Nov. 8, 2006.

(51) Int. Cl.
*H04B 1/00* (2006.01)

(52) U.S. Cl. .................................................. 375/134

(58) Field of Classification Search ................ 375/132, 375/133, 134, 135, 136, 137, 354, 357, 369, 375/372, 373, 374; 370/395.62, 507; 455/265; 702/89; 713/375, 400

See application file for complete search history.

(56) References Cited

U.S. PATENT DOCUMENTS

| | | | | |
|---|---|---|---|---|
| 5,574,754 | A | 11/1996 | Kurihara et al. | 375/367 |
| 6,052,407 | A * | 4/2000 | Ciccone et al. | 375/133 |
| 6,574,266 | B1 * | 6/2003 | Haartsen | 375/133 |
| 6,621,858 | B2 | 9/2003 | Sourour et al. | 375/150 |
| 7,577,180 | B2 * | 8/2009 | Boulton | 375/133 |
| 2003/0063655 | A1 * | 4/2003 | Young | 375/132 |
| 2003/0231607 | A1 * | 12/2003 | Scanlon et al. | 370/338 |
| 2006/0039450 | A1 * | 2/2006 | Fulton et al. | 375/133 |

FOREIGN PATENT DOCUMENTS

WO WO9941846 8/1999

OTHER PUBLICATIONS

Kirkeby, Chipcon Products from Texas Instruments, "Mono Audio Link Using Frequency Hopping", AN031, 2004, 34 pgs.
Ryan J. Pirkl, "Design and Construction of a GHz Sliding Correlator Channel Sounder for Wireless Channel Characterization and Analysis", May 15, 2005, 17 pages.
K. H. Torvmark, Chipcon Products from Texas Instruments Application Note AN014, "Frequency Hopping System", 7 pages, 2002.

* cited by examiner

*Primary Examiner*—Sam K Ahn
(74) *Attorney, Agent, or Firm*—O'Keefe, Egan, Peterman & Enders LLP

(57) ABSTRACT

A frequency hopping coordinator device scans a plurality of frequencies for request for services messages during an unused time slot in order to detect a request for service preamble on one of the frequencies and, responsive thereto, send a service packet message to an end device from which it received the request for service message on the one frequency. The service packet includes a current frequency sequence value of the coordinator device's pseudo-random number sequence and beacon timing information that indicates when periodic beacon messages occur. An endpoint device sends a request for services message on a first frequency of the plurality of frequencies scanned by the coordinator device that includes a preamble identifiable by the coordinator device. The endpoint device receives the service packet message and, responsive thereto, changes the end point's current frequency sequence value and timing information to match the values sent by the coordinator device.

36 Claims, 3 Drawing Sheets

BS=BEACON SLOT; AS=ACKNOWLEDGE SLOT; DS=DATA SLOT

SYSTEM AND METHOD FOR DATA TRANSFER IN FREQUENCY HOPPING WIRELESS NETWORKS

CROSS-REFERENCE TO RELATED PATENT APPLICATIONS

This patent application claims the benefit of U.S. Provisional Patent Application No. 60/857,740, filed Nov. 8, 2006, herein incorporated by reference in its entirety for all purposes.

FIELD OF THE INVENTION

This invention pertains to network communications and, more particularly, to frequency hopping in wireless networks.

BACKGROUND OF THE INVENTION

In time synchronized Frequency Hopping Spread Spectrum (FHSS) networks, a PN (Pseudo random Number) code that determines the hopping sequence must be time-synchronized between nodes of the network. When a node has lost synchronization, it must enter an acquisition mode to regain synchronization.

In general, one central device (herein called a Coordinator Device 130 or CD) is used to which all other devices (herein called End Devices 120 or ED) are synchronized. A network can be built using multiple CDs 130 and EDs 120. To minimize collisions, each CD 130 can have its own sequence of frequency hops here called hopping domain.

One known method is to use a sliding correlator, as discussed by Prakis, "Digital Communications," Fourth Edition, and Sklar, "Digital Communications", Second Edition. This correlator performs a serial search that is generally time consuming. It means that the searching End Device (ED) 120 needs to operate its receiver for a long time consuming battery power. Another method, discussed in Chipcon Application Note AN014, is more practical: When an ED 120 lost synchronization it might search all the channels to try to find the Beacon packet of the CD 130. The Beacon packet is send e.g. for 4 ms every 64 ms meaning that the CD can be silent 60 ms every 64 ms. Also in FHSS the Beacon is sent on a random frequency. All this makes the searching process time consuming and may also reduce the battery life of the ED 120.

BRIEF SUMMARY OF THE INVENTION

An embodiment of a frequency hopping wireless network system is shown, the network including a coordinator device configured to scan a plurality of frequencies for request for services messages during a time slot where no data packets are being transferred. The coordinator device is further configured to detect a request for service preamble on one of the plurality of frequencies and, responsive thereto, receive the remainder of the request for service message on the one frequency and send a service packet message to an end device from which it received the request for service message on the one frequency. The service packet includes a current frequency sequence value of the coordinator device's pseudo-random number sequence and beacon timing information that indicates when periodic beacon messages from the coordinator device occur. The network also includes an endpoint device configured to send a request for services message on a first frequency of the plurality of frequencies scanned by the coordinator device, where the request for services message includes a preamble identifiable by the coordinator device. The endpoint device is also configured to receive the service packet message from the coordinator device and, responsive thereto, change the end point's current frequency sequence value and timing information to match the frequency sequence and beacon timing information values sent by the coordinator device in order to synchronize the end device with the coordinator device. In a further refinement, the end device is further configured to wait a time interval for a service packet message responsive to a request for services message sent on the first frequency and, if no responsive service packet message is receive within the time interval, send a request for services message on a second frequency of the plurality of frequencies scanned by the coordinator device.

BRIEF DESCRIPTION OF THE DRAWINGS

Certain embodiments of the present invention are described below, wherein.

DETAILED DESCRIPTION OF THE INVENTION

In typical conventional solutions, the work load of the acquisition is generally put on the End Device (ED) 120, which tends to drain the ED's 120 battery. Also, the long acquisition time results in long latency, which may be unacceptable for some applications, e.g. turning on a light switch or opening a garage door. In some embodiments, the present invention may be used to reduce access latency and power consumption in the ED 120.

In contrast to prior art Frequency Hopping Spread Spectrum protocols, certain embodiments of the system and method described herein can function without time synchronization. This may be useful in low data rate networks where battery powered nodes are not required to run a timer while in sleep mode to function in accordance with the present invention.

Two exemplary embodiments of the present invention are described below: one in the context of time synchronized operation and one where no synchronization is required. Both embodiments are described in the context of the wireless architecture example shown in FIG. 1. In the example of FIG.

Figure 1:
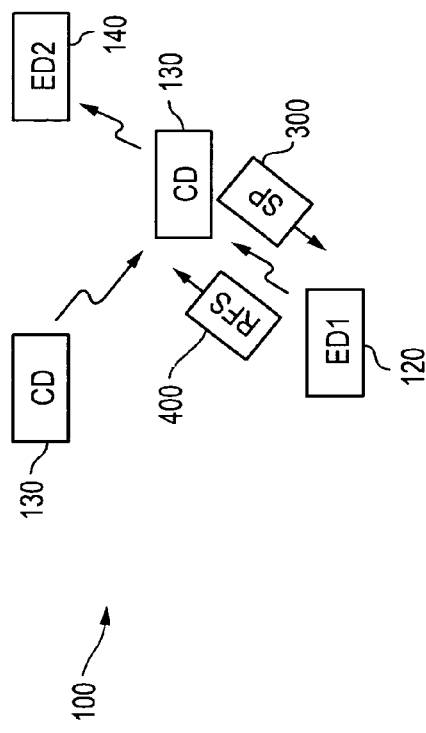
FIG. 1 is a diagram of a wireless network architecture suitable for use with the present invention illustrating two coordinator devices (CD) 130, and two end devices (EDs) 120 and 140.

1, a coordinator device (CD) 130 is typically connected to a main power source so that power consumption is less of a concern than in a battery powered device. Two endpoint devices (EDs) 120 and 140 are also shown in FIG. 1. EDs 120 and 140 are often battery powered devices, which are sensitive to the effects of power consumption on battery life. In this example, ED 1 120 is an endpoint device that normally transmits a data message, such as a remote control. ED 2 140 is an endpoint device that normally receives data.

In a time synchronized Frequency Hopping Spread Spectrum (FHSS) network, a PN (Pseudo random Number) code that determines the hopping sequence must be time-synchronized between nodes of the network. When a node has lost synchronization, it must enter an acquisition mode to regain synchronization. In conventional protocols, the burden of acquisition mode falls primarily on the endpoint devices and typically involves a significant level of data reception, in terms of time, which can drain the battery of an endpoint device.

In an embodiment of a system and method for a time synchronized network, some aspects of the acquisition processing are shifted to the CD 130, which is typically powered from a main power source. In one exemplary embodiment of the present invention, a Sync or Service Packet (SP) 300 is utilized. When a CD 130 senses that there is no traffic detected in a specific time slot 250, then the CD will use that time slot to scan all hopping frequencies to find a possible Request For Service (RFS) message 400.

Figure 2:
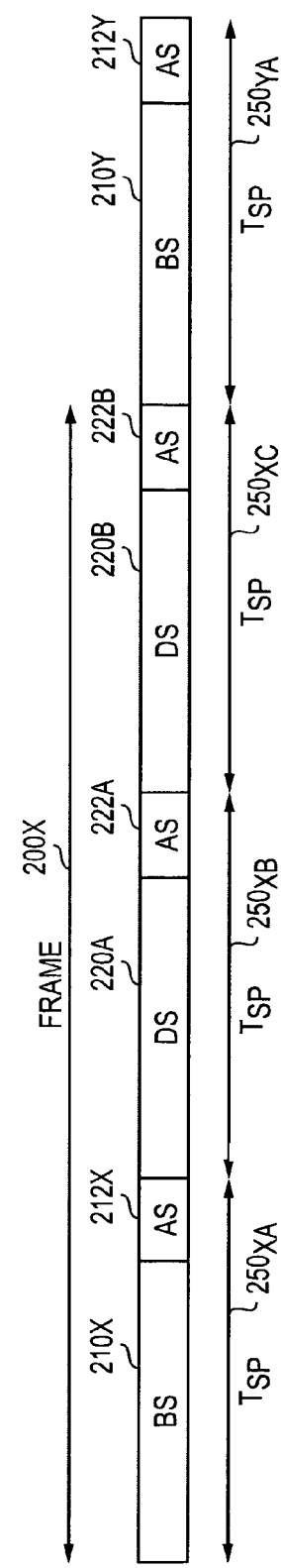
FIG. 2 is a diagram illustrating an example of a frame structure showing frame 200 and slot 250 order in the time domain in a time synchronized system.

FIG. 2 is a diagram illustrating an example of a scanning cycle performed by a CD 130. Each frame 200 of the scanning cycle starts at the start of the Beacon Slot (BS) 210. In the figure, the first frame instance is labeled 210X, and the next frame, which is not labeled, is frame 210Y. The start of the other slots in a frame is referenced to the start of the frame. Data Packets (DP) 224 can be sent out during any Data Slot (DS) 220. If the receiving node successfully received a DP 224, then it sends out an acknowledgement 222 on the same frequency as the data was received in the succeeding Acknowledge Slot (AS). In the figure, each instance of DS is labeled with a different letter, 220A and 220B. Similarly, the AS slots are labeled 222A and 222B. A DS 220A and its succeeding AS 222A is called a slot pair 250. In the figure, the slot pair intervals are labeled with letters to identify the frame and slot pair within the frame. In the first frame the first slot pair interval is labeled 250XA, the next is 250 XB, and the third is 250 XC. The first slot pair of the next frame is labeled 250YA. In a low data rate network, the DS 220 and AS 222 packets will be empty most of the time, meaning there is no transmission most of the time. This is typical of applications where there is a very low duty cycle of data transmission, e.g. messages to open a garage door, turn on a light, or check a thermostat setting. In the example of FIG. 2, the BS 210 rate is once per three slot pairs 250. However, this example is simplified for clarity and a more typical value would be on the order of one BS per hundred slot pairs.

Figure 3:
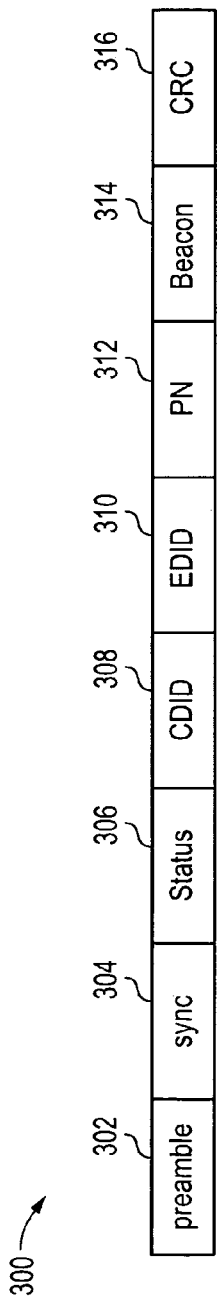
FIG. 3 is a diagram illustrating an example of a service packet (SP) 300 transmitted by a CD 130 of FIG. 1 in a time synchronized system.

If the CD 130 detects an RFS 400 message and the RFS 400 was sent by an ED 120 having an ID 414 value that is stored in the CD's 130 client list, then the CD 130 will respond with a Sync or Service Packet (SP) 300 in the next available Data Slot (DS) 220. An example of the fields in a SP 300 slot is shown in FIG. 3. In this example, the CDID field 308 identifies the CD 130 that sends out the SP 300. The EDID 310 identifies the ED 120 that had sent out the RFS 400. The PN 312 is the current frequency sequence value of the CD's Pseudo Random Generator (PRG) or Frequency Look-up Table (FLUT) 510. It allows the RFS sender to synchronize to the hopping domain of the CD 130. The Beacon field 314 tells the RFS sender where the beacons are located in the time domain in order to get the sender device synchronized. The preamble 302 indicates the beginning of the SP 300. The synch field 304 contains additional synchronization information. The status field 306 contains status information about the CD 130. The CRC field 316 is a Cyclic Redundancy Checksum used to validate the accuracy of the SP 300 packet.

A Request For Service (RFS) packet 400 is transmitted when an ED 120 comes out of standby mode and it is not synchronized to any CD 130. To establish synchronization, it will immediately start to transmit a Request For Service (RFS) message 400. Some data bits can be added to the RFS 400 using the PSDU field 416 such that the subsequent SP 300 may also used as acknowledgement. This may further reduce the latency and power consumption required for synchronization by eliminating the need for a separate acknowledgment packet transmission. Note that an RFS packet 400 may be sent from one CD 130 device to another CD device in, for example, a mesh network topology having multiple CDs 130.

Figure 4:
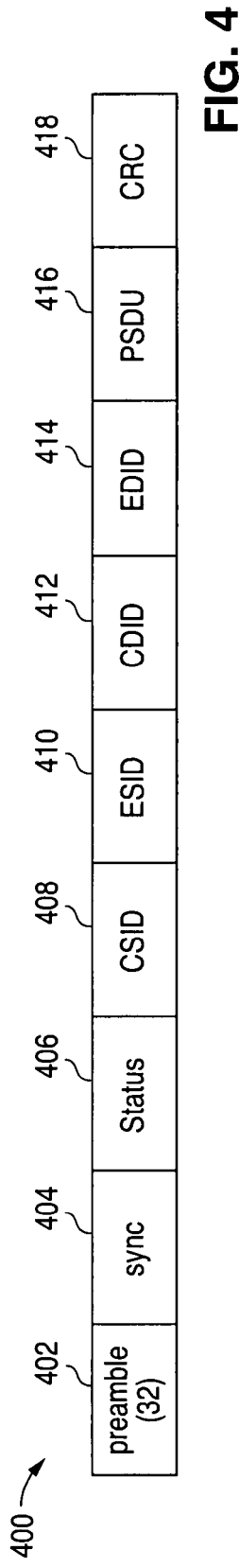
FIG. 4 is a diagram illustrating an example of a Request for Service (RFS) packet 400 transmitted by one of the EDs 120 of FIG. 1 in a time synchronized system.

FIG. 4 illustrates one exemplary embodiment of a RFS packet 400. A long preamble 402 is used (e.g. 32 bytes) to allow the CD 130 to find the RFS 400 within one time slot period 250. When the RFS 400 has been sent out, the end device 120 needs to enable its receiver for at least the time duration of one slot pair 250 to "catch" the SP 300. The synch field 404 contains information about the EDs 120 synchronization. The status field 406 contains status information about the ED 120. The CDID 412 identifies the CD 130 that the RFS 400 is being sent to. The EDID field 414 identified the ED 120 that sent the RFS 400. The CRC 418 is a Cyclic Redundancy Checksum used to validate the accuracy of the RFS 400 packet.

Figure 5:
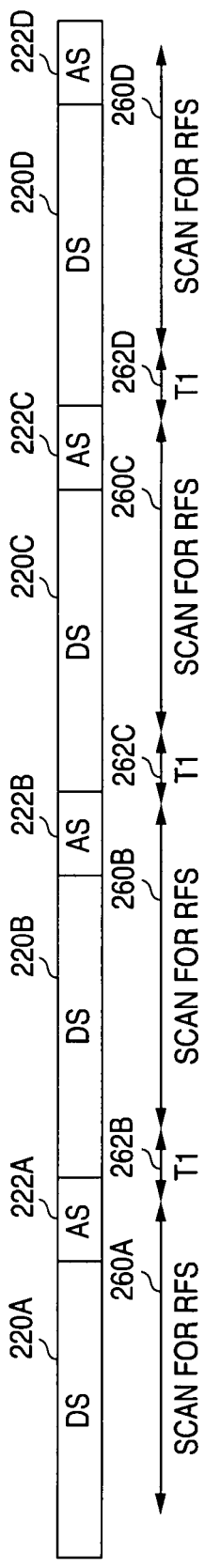
FIG. 5 is a diagram illustrating an example of a scan operation performed during a scanning for RFS interval 260 by a CD 130 of FIG. 1 in a time synchronized system.

FIG. 5 is a diagram illustrating an example of the scanning activity of the CD 130 in a synchronized network when there is no traffic. In a low data rate traffic network, this is the most typical operating mode. Here the Beacon Slot 210 for the frame is not shown for purposes of simplicity and because it is not required for operation. During each hopping domain time period T1 262, the CD 130 scans for traffic in its own hopping domain. During the "scan for RFS" period 260, the CD 130 scans every frequency that is used in the network. Different instances of the scan for RFS period are labeled with letters: 260A, 260B, etc. When it tunes to a frequency, the CD 130 will search for a preamble 402. If no preamble 402 is found, then the CD 130 tunes to the next frequency, and so on. When nothing is found in the scan for RFS period 260, the CD 130 will check again in its own hopping domain (T1) 262, just in time to catch possible traffic in the Data Slot 220. Different instances of the T1 interval are labeled with letters: 262B, 262C, etc.

Figure 6:
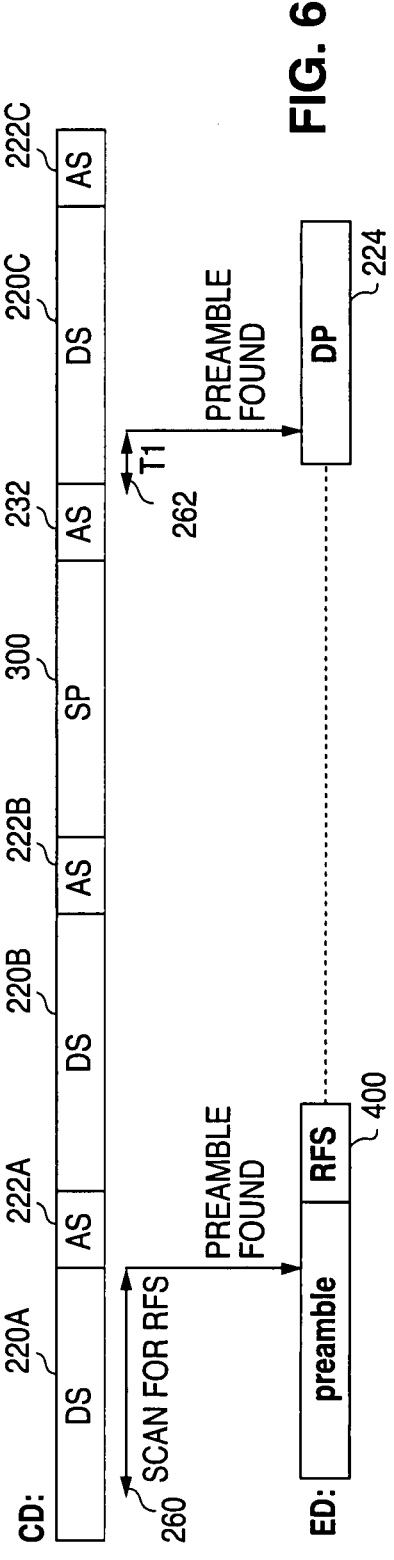
FIG. 6 is a diagram illustrating an example of an exchange of packets between a CD 130 and an ED 120 of FIG. 1 in a time synchronized system.

FIG. 6 is a diagram illustrating an example of a scenario wherein a CD 130 is scanning for an RFS 400 and discovers an RFS transmission 400, which is followed by a synchronized data transfer in a data packet (DP) 224. In this example, the ED 120 sends out a RFS 400 while the CD 130 is scanning for an RFS 400. When the CD 130 finds the RFS 400 within slot pair N (220B and 222B), then the CD 130 will respond with an SP 300 in slot N+1. The SP 300 is transmitted on the same frequency that the ED 120 sent the RFS 400, as detected by the CD 130. This is necessary because, at this point in time, the ED 120 is not synchronized to the hopping domain of the CD 130 yet. After the ED 120 receives the SP 300, then it can be synchronized both in time and frequency to the CD 120. In the example of FIG. 6, the ED 120 stays synchronized and can send more data in slot N+2 (220C and 222C). The synchronized transfer uses frequencies belonging to the hopping domain of the CD 130 such that the preamble can be found within T1 262.

In one embodiment, the coordinator device 130 scans a set of available communication frequencies for a request of service message following a set sequence, which may be a pseudo random sequence. In this embodiment, the end device 120 is configured to transmit request of service messages on the set of available communication frequencies following the same sequence as the coordinator device is scanning, but in reverse order. This generally results in the search sequences of the end device and the coordinator device converging with one another, which is useful because the two devices may start their search sequences at different points in time. It is also useful for the end device 120 to be configured to transmit the request for service message using a carrier sense multiple access (CSMA) approach, wherein the end device senses whether a particular carrier frequency is already in use before attempting to transmit the request for service message. This approach avoids collisions in transmission. In a further refinement, an embodiment of end device 120 may be configured to move to the next frequency in its search sequence in order to transmit the request for service message when it uses CSMA to sense a busy carrier frequency during its synchronization cycle. The pseudo random sequence may, in some embodiments, be provided by the PRG or FLUT 510 that is discussed further below.

In the synchronized embodiment, it is preferable to have accurate slots when higher data rates are desired. Using the fast hopping acquisition of the system and method described above, the ED 120 nodes may, in some applications, be shut-off when no communication is needed. In low data rate networks, the ED 120 nodes are inactive most of the time, so battery life in the EDs 120 will be extended because power consumption is reduced in this mode.

Figure 7:
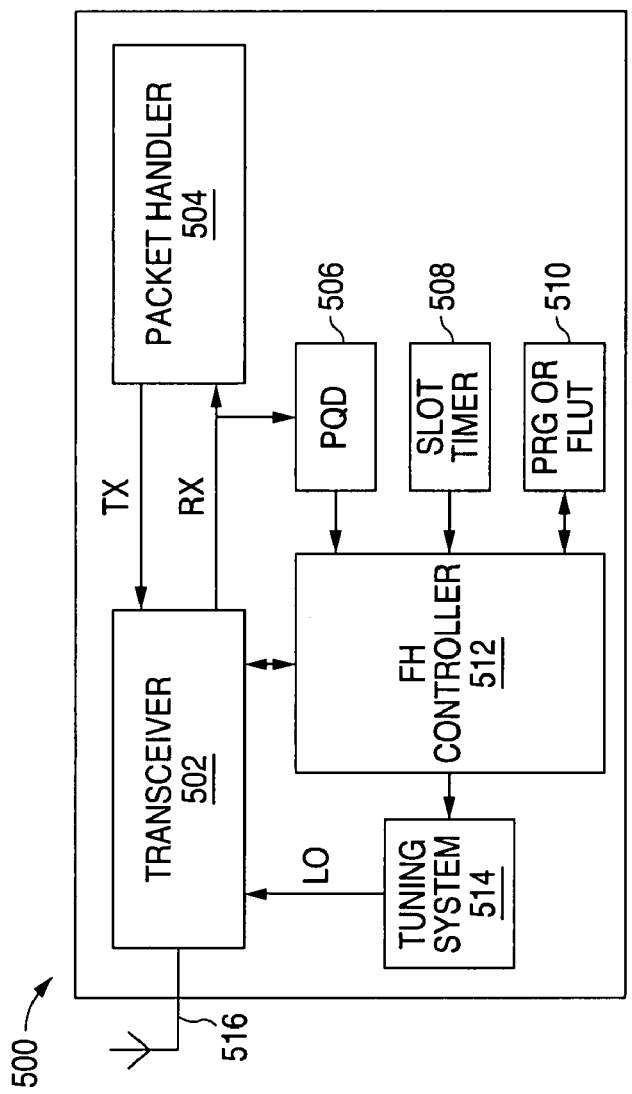
FIG. 7 is a functional block diagram illustrating an example of an architecture suitable for use as the CDs 130 and EDs 120 of FIG. 1.

To facilitate synchronization acquisition in accordance with some embodiments of the present invention, it is preferred that some functions be integrated in an embodiment of a transceiver integrated circuit (IC) 500. An example of a transceiver is shown in FIG. 7. These functions include:

1. Slot timer 508
2. Pseudo Random Generator (PRG) or Frequency Lookup Table (FLUT) with synchronization capability 510
3. Preamble Quality Detector 506
4. Tuning System 514
5. Frequency Hopping controller 512
6. Packet Handler 504
7. Transceiver 502
8. Antenna 516

The functions mentioned are preferably programmable such that a wide variety of hopping schemes can be programmed.

In one embodiment of an End Device (ED) 130, when the ED's transceiver 502 wakes up from sleep mode, it will immediately send out a Request For Synchronization (RFS) 400 using the packet handler 504, then it will enable the receiver 502 to receive the Synchronization Packet (SP) 300. The receive enable timing will be controlled by the slot timer 508. When no SP 300 is received by the ED 120, the RFS 400 will be repeated on another frequency with or without random back-off using the packet handler 504, the FH controller 512 and the slot timer 508. When the SP 300 is received in the ED 120, then the transceiver 502 can enter sleep mode or enter the synchronous mode. In synchronous mode, the transceiver 502 will synchronize the pseudo-random frequency sequence value of its Pseudo Random Generator or Frequency Look-up Table 510 such that it can enter the hopping domain of its CD 130. In synchronous mode, the ED's 120 receiver 502 is enabled during the Beacon Packet (BP) that is transmitted periodically by the CD 130, where the slot timer 508 is used to determined the Beacon Slot 210. The BP is used to keep the transceiver 502 synchronized to the CD 130 and to allow the ED 120 to receive information. Whenever some data needs to be transmitted from the ED 120 to the CD 130, the ED 120 can use the next available Data Slot 220.

Central or Coordinator Device (CD) 130 operation: In general, a CD 130 is assumed to be a main powered device that is active most of the time. In one exemplary embodiment of a CD 130, the CD 130 will periodically transmit Beacon Packets using the slot timer 508 and the packet handler 504. At the start of a data slot 220, the CD 130 will enable its receiver 502 tuned to a frequency belonging to its own hopping domain. When there is no preamble 402 received, then the CD 130 will enter a fast scan mode in which it will search for a preamble on other frequencies outside its hopping domain. When no preamble is detected using the preamble quality detector (PQD) 506, the receiver jumps to the next frequency until a preamble 402 is detected or when the current time slot is finished. In the latter case, the CD 130 receiver 502 will return to its own hopping domain and start the procedure all over again. When a preamble 402 is received during the scanning phase, then the CD receiver will stay tuned on that channel to check if there is a RFS 400. If a RFS 400 is received on the frequency, then the CD130 will respond with a SP 300 in the next available slot 250 using the same frequency as where it received the RFS 400.

The suggested functions in the preferred embodiment enable small designs that don't need a master control unit (MCU) saving both (leakage) power and bill of material (BOM) cost. Also, the local timing on the transceiver IC 500 allows for better timing accuracy due to the absence of control latency associated with the external serial bus. Better timing also generally translates to lower power.

Figure 8:
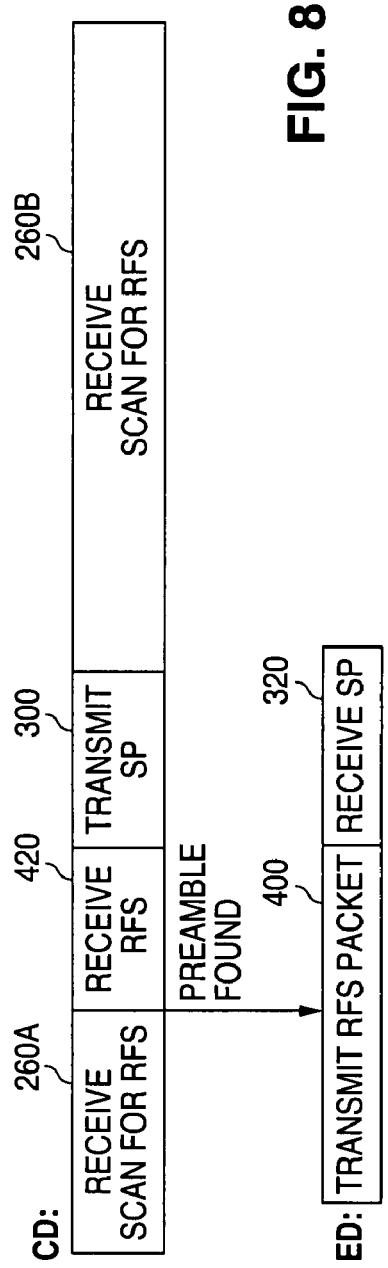
FIG. 8 is a diagram illustrating an example of an exchange of packets between a CD 130 and an ED 120 of FIG. 1 in a non-synchronized system.

In a non-synchronized network all data is sent using RFS (Request For Service) packets 400. No DP (Data Packets) 224 are used, so there is no need for a frame structure. In an exemplary non-synchronized embodiment, the CD 130 is in scan mode much of the time and the hopping sequence is determined by the ED 120. FIG. 8 is a diagram illustrating one example of a non-synchronized data transfer. The CD 130 scans for an RFS 400 from an ED 120. In the example shown, an ED 120 sends an RFS 400 that is received 420 by the CD 130, which responds by transmitting a SP 300. The ED 120 receives the SP 320 transmitted by the CD 130. The CD 130 then resumes scanning for an RFS 400. Note that there is no DP 224 sent by the ED 120. In a non-synchronized system or method, the SP 300 can be sent by the RFS receiver, e.g. CD 130, right after it has received the RFS 400. This generally saves battery life since the ED 120 can shut down its receiver after transmitting the RFS 400 without transmitting a DP 224. Also, a data transmission from the CD 130 to the ED 120 may be included in an SP 300 sent by the CD 130 to the ED 120, which may eliminate the need for transmission of a separate DP 224 from the CD 130 to the ED 120. An architecture suitable for a non-synchronized device is similar to that shown in FIG. 7, though some components may be eliminated in some applications.

Note that, when an RFS 400 has been sent out by an ED 120, the ED 120 may be configured to enter a back-off period if no response is received from the CD 130. In this case, the ED 120 would resend the RFS 400 after a fixed time-out period or a random back-off period.

In another mode, an ED 120 is configured to periodically send an RFS 400 to the CD 130 in order to check whether the CD 130 has data to transmit to the ED 120. In effect, the ED 120 polls the CD 130 for data. If there is data destined for the ED 120, then the CD 130 may include the data in an SP 300 send to acknowledge the RFS 400 from the ED 120. This approach may be applied to both synchronized and non-synchronized systems.

Note that SPs 300 can be used for a variety of functions in various embodiments. For example, an SP 300 may be used as an acknowledgement to the sender of an RFS 400. In a synchronized system example, an SP 300 may be used to synchronize both time and frequency. And, in another example, an SP 300 may be used to send data to an RFS sender such that a polling scheme may be supported.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method for synchronizing communications between an end device and a coordinator device in a frequency hopping wireless network, the method comprising the steps of:
   a. the coordinator device scanning a plurality of frequencies for request for services messages during a time slot where no data packets are being transferred;
   b. the end device sending a request for services message on a first frequency of the plurality of frequencies, where the message includes a preamble identifiable by the coordinator device;
   c. if the coordinator device detects the request for service preamble on the first frequency, the coordinator device receiving the remainder of the request for services message on the first frequency and sending a service packet message to the end device from which it received the request for services message on the first frequency, where the service packet message includes:
      i. a current frequency sequence value of the coordinator device's pseudorandom number sequence, and
      ii. beacon timing information that indicates when periodic beacon messages from the coordinator device to the end device occur;
   d. if the end device receives the service packet message, the end device changing its current frequency sequence value and timing information to match the frequency sequence and beacon timing information values sent by the coordinator device in order to synchronize the end device with the coordinator device.

2. The method of claim 1, the method further comprising the step of, if the end device does not receive the service packet message on the first frequency within a time interval after sending the request for services message, then the end device will initiate another attempt to synchronize by sending another request for services message on a second frequency of the plurality of frequencies.

3. The method of claim 2, where the interval of time waited before initiating another synchronization attempt is at least one of a fixed value, a calculated value, and a pseudorandom value.

4. The method of claim 2, wherein:
   the step of the coordinator device scanning a plurality of frequencies for request for services messages during a time slot where no data packets are being transferred further comprises the coordinator device scanning the plurality of frequencies for request for services messages following a pseudorandom sequence; and
   the step of, if the end device does not receive a service packet message on the first frequency within a time interval after sending the request for services messages, then the end device will initiate another attempt to synchronize by sending another request for services message on a second frequency of the plurality of frequencies further comprises the second frequency being selected based on following the pseudorandom sequence in reverse order.

5. The method of claim 4, where the step of the end device sending a request for services message on a first frequency of the plurality of frequencies further comprises the end device sensing whether the first frequency is busy before attempting to transmit the request for services message and move to a next frequency in the reverse order of the pseudorandom sequence when the end device senses a busy frequency.

6. The method of claim 1, the method further comprising the step of the end device sending a data packet to the coordinator device during an available time slot, using a frequency determined by the end device's pseudorandom number sequence following the end device and coordinator device successfully synchronizing.

7. The method of claim 6, the method further including the step of the coordinator device, responsive to receiving a data packet from the end device, sending an acknowledgement to the end device from which it received the data packet during a second portion of the time slot used to transfer the data packet using the same frequency to send the acknowledgement as was used by the end device to send the data packet.

8. The method of claim 1, the method further comprising the steps of:
   the coordinator device, following the end device and the coordinator device successfully synchronizing, sending a data packet to the end device during an available time slot, using a frequency determined by the coordinator device's pseudorandom number sequence; and
   the end device receiving the data packet sent by the coordinator device using the synchronized pseudorandom number sequence and beacon information.

9. The method of claim 8, the method including the step of the end device, upon receiving a data packet from the coordinator device, sending an acknowledgement to the coordinator device from which it received the data packet during a second portion of the time slot used to transfer the data packet, using the same frequency to send the acknowledgement as was used to transmit the data packet.

10. The method of claim 1, the method further comprising the step of the end device, following the end device and coordinator device successfully synchronizing, receiving the beacon packets sent from the coordinator device periodically in timeslots allocated for the beacon packets and maintaining synchronization with the coordinator device using the periodic beacon packets.

11. The method of claim 1, the method further comprising the end device initiating synchronization after exiting a standby mode.

12. The method of claim 1, where the step of the end device sending a request for services message further includes sending data in the request for services message sent to the coordinator device.

13. The method of claim 1, where the step of the coordinator device sending a service packet message to the end device further includes sending data in the service packet sent to the end device in response to the reception of a request for services message from that end device.

14. The method of claim 1, where the end device further comprises another coordinator device.

15. The method of claim 1, the method further comprising the step of the end device sending a data packet to the coordinator device using carrier sense multiple access after the end device and coordinator device are synchronized, wherein a pseudorandom back-off time period is utilized when a frequency is busy, the frequency for transmitting the packet is determined by a pseudorandom sequence synchronized with the coordinator device.

16. A method for transferring data in a frequency hopping wireless network between an end device and a coordinator device comprising the steps of:
  a. the coordinator device scanning a plurality of frequencies for request for services messages during a time slot where no data packets are being transferred;
  b. the end device sending a request for services message on a first frequency of the plurality of frequencies, where the request for services message includes a preamble identifiable by the coordinator device;
  c. if the coordinator device detects the request for services message preamble on the first frequency, the coordinator devices receiving the remainder of the request for services message using the first frequency and sending a service packet message to the end device from which it received the request for services message using the first frequency;
  d. if the end device detects the service packet message on the first frequency within a time interval, the end device receiving the service packet message from the coordinator device using the first frequency; and
  e. if the end device does not detect the service packet message on the first frequency within the time interval, the end device initiates another attempt to transfer data by sending another request for services message on a second frequency of the plurality of frequencies scanned by the coordinator device.

17. The method of claim 16, where at least one of the request for services message and the service packet message include data.

18. The method of claim 16, where the time interval after sending the request for services message is at least one of a fixed value, a calculated value, and a pseudorandom value.

19. The method of claim 16, where the step of the end device sending a request for services message on a first frequency further comprises the end device including data in the request for services message sent to the coordinator device in order to perform asynchronous data transfer.

20. The method of claim 16, where the step of the coordinator device sending a service packet message to the end device further comprises the coordinator device including data in the service packet message sent to the end device in response to the reception of a request for services message from that end device in order to perform asynchronous data transfer.

21. The method of claim 16, where data is transferred synchronously by synchronizing the end device with the coordinator device by:
  including in the service packet message from the coordinator device a frequency sequence number and beacon slot timing information of the coordinator device;
  the end device synchronizing to the coordinator device using the frequency sequence number and beacon slot timing information from the coordinator device;
  transferring a data packet from the end device to the coordinator device during an available time slot, using a frequency determined by the end device's frequency sequence number.

22. The method of claim 21, the method further comprising maintaining synchronization of the end device utilizing beacon packets sent from the coordinator device periodically in timeslots allocated for the beacon packets.

23. The method of claim 21, where the end device may decide to initiate synchronization immediately after exiting standby mode.

24. The method of claim 23, where the end device is another coordinator device.

25. The method of claim 16, wherein:
  the step of the coordinator device scanning a plurality of frequencies for request for services message during a time slot where no data packets are being transferred further comprises the coordinator device scanning the plurality of frequencies for request for services messages following a pseudorandom sequence; and
  the step of, if the end device does not detect the service packet message on the first frequency within the time interval, the end device initiates another attempt to transfer data by sending another request for services message on a second frequency of the plurality of frequencies scanned by the coordinator device further comprises the second frequency being selected based on following the pseudorandom sequence in reverse order.

26. The method of claim 25, where the step of the end device sending a request for services message on a first frequency of the plurality of frequencies further comprises the end device sensing whether the first frequency is busy before attempting to transmit a request for services message and move to a next frequency in the reverse order of the pseudorandom sequence when the end device senses a busy frequency.

27. The method of claim 16, where the step of the end device sending a request for services message on a first frequency of the plurality of frequencies further comprises the end device sensing whether the first frequency is busy before attempting to transmit a request for services message on the first frequency and not sending a request for services message on the first frequency if the first frequency is busy.

28. A frequency hopping wireless network system, the system comprising:
  a coordinator device configured to:
    scan a plurality of frequencies for request for services messages during a time slot where no data packets are being transferred;

detect a request for service preamble on one of the plurality of frequencies and, responsive thereto, receive the remainder of the request for services message on the one frequency and send a service packet message to an end device from which it received the request for services message on the one frequency, where the service packet message includes:
  i. a current frequency sequence value of the coordinator device's pseudorandom number sequence, and
  ii. beacon timing information that indicates when periodic beacon messages from the coordinator device occur; and
an endpoint device configured to:
  send a request for services message on a first frequency of the plurality of frequencies scanned by the coordinator device, where the request for services message includes a preamble identifiable by the coordinator device;
  receive the service packet message from the coordinator device and, responsive thereto, change the end point's current frequency sequence value and timing information to match the frequency sequence and beacon timing information values sent by the coordinator device in order to synchronize the end device with the coordinator device.

29. The frequency hopping wireless network system of claim 28, where the endpoint device is further configured to wait a time interval for a service packet message responsive to a request for services message sent on the first frequency and, if no responsive service packet message is received within the time interval, send a request for services message on a second frequency of the plurality of frequencies scanned by the coordinator device.

30. The frequency hopping wireless network system of claim 28, wherein the coordinator device is further configured to scan at least a portion of the plurality of frequencies for request for services messages following the coordinator device's pseudorandom sequence and the endpoint device is further configured to attempt to transmit request for services messages on the plurality of frequencies following the coordinator device's pseudorandom sequence in reverse order.

31. The frequency hopping wireless network system of claim 30, where the endpoint device is further configured to sense whether a frequency of the plurality of frequencies is busy before attempting to transmit a request for services message and move to a next frequency in the reverse order of the coordinator device's pseudorandom sequence when the endpoint device senses a busy frequency.

32. The frequency hopping wireless network of claim 28, where the endpoint device is further configured to sense whether a frequency of the plurality of frequencies is busy before attempting to transmit a request for services message.

33. The frequency hopping wireless network system of claim 28, wherein each of the endpoint device and coordinator device includes a transceiver, a packet handler, a tuning system, a frequency hopping controller, a preamble quality detector, a slot timer, and at least one of a pseudorandom number generator or frequency look-up table.

34. The frequency hopping wireless network system of claim 28, wherein the endpoint device, after successful synchronization with the coordinator device, is further configured to transfer data synchronously with the coordinator device by:
  a. sending a data packet to the coordinator device during an available time slot, using a frequency determined by the endpoint device's pseudorandom number sequence that is synchronized to the coordinator device's pseudorandom number sequence;
  b. receiving a data packet from the coordinator device during an available time slot, using a frequency determined by the end device's pseudorandom number sequence that is synchronized to the coordinator device's pseudorandom number sequence.

35. The frequency hopping wireless network system of claim 28, wherein, after successful synchronization with the coordinator device, the endpoint device is further configured to maintain synchronization by receiving the beacon packets sent from the coordinator device periodically in timeslots allocated for the beacon packets.

36. The frequency hopping wireless network system of claim 28, wherein at least one of the request for services message and the service packet message includes a data payload.

* * * * *